(12) United States Patent
King

(10) Patent No.: US 7,631,115 B2
(45) Date of Patent: Dec. 8, 2009

(54) TECHNIQUES TO MANAGE DATA TRANSFER UTILIZING BUFFER HINTS INCLUDED IN MEMORY ACCESS REQUESTS

(75) Inventor: Steven R. King, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 11/051,114

(22) Filed: Feb. 4, 2005

(65) Prior Publication Data

US 2006/0179178 A1 Aug. 10, 2006

(51) Int. Cl.
G06F 13/28 (2006.01)
G06F 3/00 (2006.01)

(52) U.S. Cl. .......................................... 710/22; 710/5
(58) Field of Classification Search ................... 710/22, 710/5
See application file for complete search history.

(56) References Cited

U.S. PATENT DOCUMENTS

| | | | | |
|---|---|---|---|---|
| 5,826,101 A | * | 10/1998 | Beck et al. | 712/34 |
| 5,875,352 A | * | 2/1999 | Gentry et al. | 710/23 |
| 6,012,106 A | * | 1/2000 | Schumann et al. | 710/22 |
| 6,389,509 B1 | * | 5/2002 | Berenguel et al. | 711/113 |
| 6,606,682 B1 | * | 8/2003 | Dang et al. | 711/113 |
| 6,738,836 B1 | * | 5/2004 | Kessler et al. | 710/22 |
| 2002/0062424 A1 | * | 5/2002 | Liao et al. | 711/129 |
| 2006/0179173 A1 | * | 8/2006 | Bockhaus | 710/22 |

OTHER PUBLICATIONS

CRC definition, www.xreferplus.com, Ian R. Sinclair, 2000, Collins Dictionary of Computing.*
Parity bit definition, www.xreferplus.com, 1999, Newness, Newness Dictionary of Electronics.*
Network adapter definition, www.xreferplus.com, 2001, Institute of Electrical and Electronics Engineers, Inc.*
Jim Brewer et al., PCI Express Technology, Feb. 2004, Dell, p. 1.*

* cited by examiner

Primary Examiner—Henry W. H. Tsai
Assistant Examiner—Hyun Nam
(74) Attorney, Agent, or Firm—Caven & Aghevli LLC

(57) ABSTRACT

Techniques to indicate whether datum transferred from a memory device to a second device is likely to be accessed again by the second device. The second device may include a buffer memory to store the datum when the datum is indicated as likely to be accessed again. If the second device is to access the datum again after receipt from the memory device, the second device may retrieve the datum from the buffer memory instead of from the memory device. Accordingly, multiple accessed of datum transferred once from an external memory are possible.

20 Claims, 5 Drawing Sheets

TECHNIQUES TO MANAGE DATA TRANSFER UTILIZING BUFFER HINTS INCLUDED IN MEMORY ACCESS REQUESTS

FIELD

The subject matter disclosed herein relates to techniques to manage transfer and processing of data.

RELATED ART

Network-based communications between computers are increasing in speed. Advances in network speeds, however, have not been fully utilized due to latency that may be associated with data transfer and protocol processing in computers. Techniques are needed to accelerate data transfer and protocol processing speeds in computers.

BRIEF DESCRIPTION OF THE DRAWINGS

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
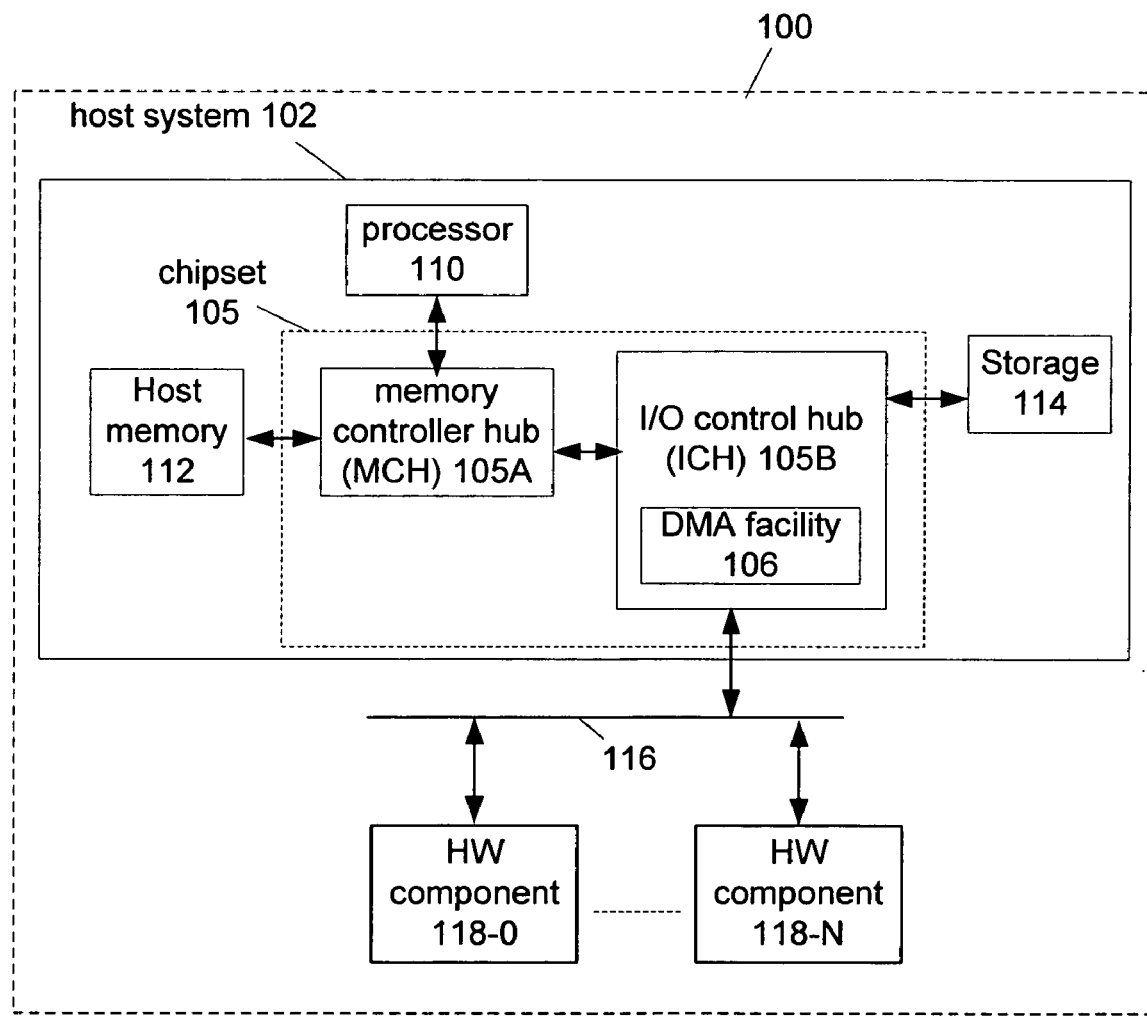
FIG. 1 depicts a computer system in which some embodiments of the present invention may be used.

FIG. 1 depicts in computer system 100 a suitable system in which embodiments of the present invention may be used. Computer system 100 may include host system 102, bus 116, and hardware (HW) components 118-0 to 118-N.

Host system 102 may include chipset 105, processor 110, host memory 112, and storage 114. Chipset 105 may include a memory controller hub (MCH) 105A that may provide intercommunication among processor 110 and host memory 112 as well as a graphics adapter that can be used for transmission of graphics and information for display on a display device (both not depicted). Chipset 105 may further include an I/O control hub (ICH) 105B that may provide intercommunication among MCH 105A, storage 114, and bus 116. For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA), although other protocols may be used.

Direct memory access (DMA) facility 106 may be capable of retrieving or storing information from or into at least host memory 112, storage 114, or any of HW components 118-0 to 118-N, where N≧1 at least using well known DMA procedures. DMA facility 106 may further include the capability to process information as well as store information that is to be accessed by DMA facility 106 more than once, in accordance with an embodiment of the present invention. As used herein, any "access" by DMA facility may include at least transfer or processing of datum. A "reaccess" by a DMA facility may or may not be the same logical operation as previously performed on the datum. DMA facility 106 may be implemented as part of MCH 105A or ICH 105B, although other implementations may be used. In one embodiment, the DMA facility may reside in a host processor package or elsewhere.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, and/or a network accessible storage device.

Bus 116 may provide intercommunication among host system 102 and HW components 118-0 to 118-N. Bus 116 may support serial or parallel communications. Bus 116 may support node-to-node or node-to-multi-node communications. Bus 116 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Each of HW components 118-0 to 118-N may be any device capable of receiving information from host system 102 or providing information to host system 102. HW components 118-0 to 118-N can be integrated into the same computer platform as that of host system 102 such as in the chipset. HW components 118-0 to 118-N may intercommunicate with host system 102 using bus 116. For example, any of HW components 118-0 to 118-N may be implemented as a network interface capable of providing intercommunication between host system 102 and a network (not depicted) in compliance with formats including, but not limited to, Ethernet or SONET/SDH. For example, the network may be any network such as the Internet, an intranet, a local area network (LAN), storage area network (SAN), a wide area network (WAN), or wireless network.

With respect to data communications, computer system 100 may be compatible with any of (but not limited to): RDMA, Internet Small Computer System Interface (iSCSI), Stream Control Transmission Protocol (SCTP), and/or iSCSI Extensions for RDMA (iSER). RDMA is described for example at www.rdmaconsortium.com as well as in An RDMA Protocol Specification, Version 1.0 (October 2002). iSCSI is described for example at RFC 3720: Internet Small Computer Systems Interface (iSCSI) (April 2004). SCTP is described for example at The Internet Society RFC-3286, An Introduction to the Stream Control Transmission Protocol (SCTP), (May 2002). iSER is described for example at iSCSI Extensions for RDMA Specification, Version 1.0 (July 2003).

Computer system 100 may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Figure 2A:
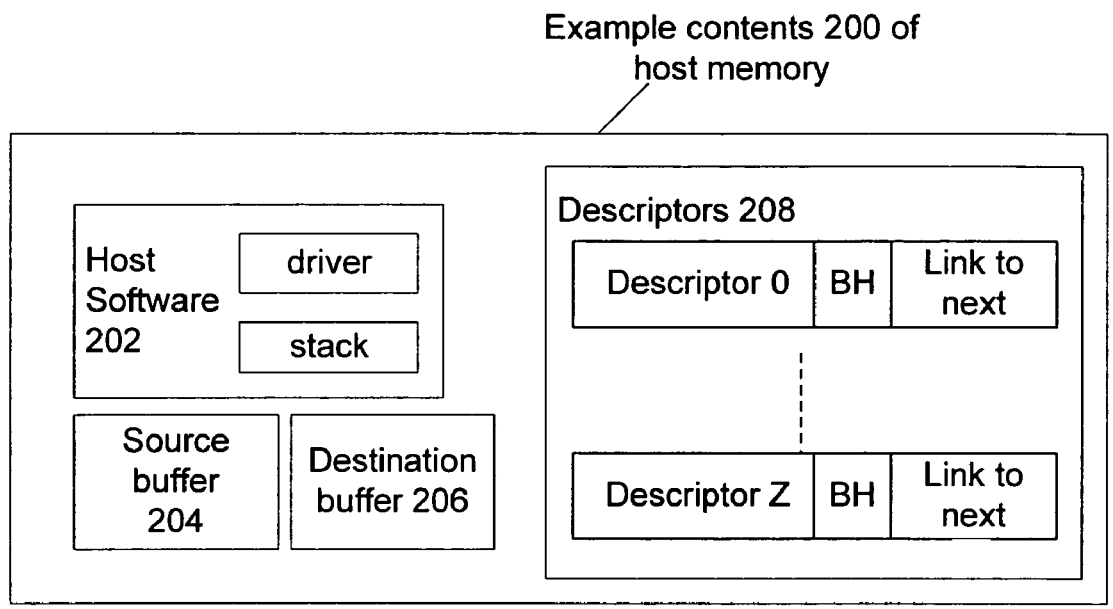
FIG. 2A depicts an example implementation of contents of a host memory that may be used in an embodiment of the present invention.

FIG. 2A depicts an example implementation of contents of a host memory that may be used in an embodiment of the present invention. For example, the host memory may store host software 202, source buffer 204, destination buffer 206, and descriptors 208. For example, host software 202 may include at least a device driver for any of HW components 118-0 to 118-N, protocol processing stack, as well as an operating system (not depicted) and applications (not depicted). The protocol processing stack may process packets to determine TCP/IP compliance in accordance with relevant TCP/IP standards. The TCP/IP protocol is described in the publication entitled "Transmission Control Protocol: DARPA Internet Program Protocol Specification," prepared for the Defense Advanced Projects Research Agency (RFC 793, published September 1981). The protocol processing stack may further provide protocol processing for communications with standards such as but not limited to: RDMA, iSCSI, SCTP/IP, and iSER. The operating system (not depicted) may be executed by processor 110. For example, suitable embodiments of the OS include, but are not limited to, Linux, FreeBSD, or Microsoft Windows compatible operating systems. Applications (not depicted) can be one or more machine executable programs that may utilize data at least received from or transferred to a network. An application may include, but not be limited to, for example, a web browser, input/output filter, an e-mail serving application, a file serving application, or a database application.

Source buffer 204 and destination buffer 206 may store data received from any of any of HW components 118-0 to 118-N or from any device or memory. For example, "data" may include any information stored in source buffer 204 or destination buffer 206 that is available for transfer to another location within source buffer 204 or destination buffer 206 or another destination altogether. For example, "data" may include packets received from a network.

Each descriptor stored among descriptors 208 may be associated with a datum transfer operation. As used herein, a "datum" may refer to data requested to be accessed (e.g., transferred or processed) by a single descriptor. For example, a descriptor may include the following fields: operation (e.g., datum processing or datum move), address of the target datum, length of the datum to move or process, buffer_hint code (shown as "BH"), and link_to_next code, in accordance with an embodiment of the present invention. The buffer_hint code may specify whether the datum to be retrieved will likely be or not likely be requested to be accessed again, for example, by a DMA facility. The link_to_next code may indicate whether a next accessed descriptor is part of the same grouping. For example, the host software such as a device driver or protocol processing stack may determine which descriptors are in the same group as well as the order in which descriptors (and associated datum) are to be accessed and accordingly provide proper setting of the link_to_next code for each descriptor. A logical group of descriptors is herein referred to as a descriptor bundle. For example, each of the buffer_hint and link_to_next codes may be one (1) bit in length.

Figure 2B:
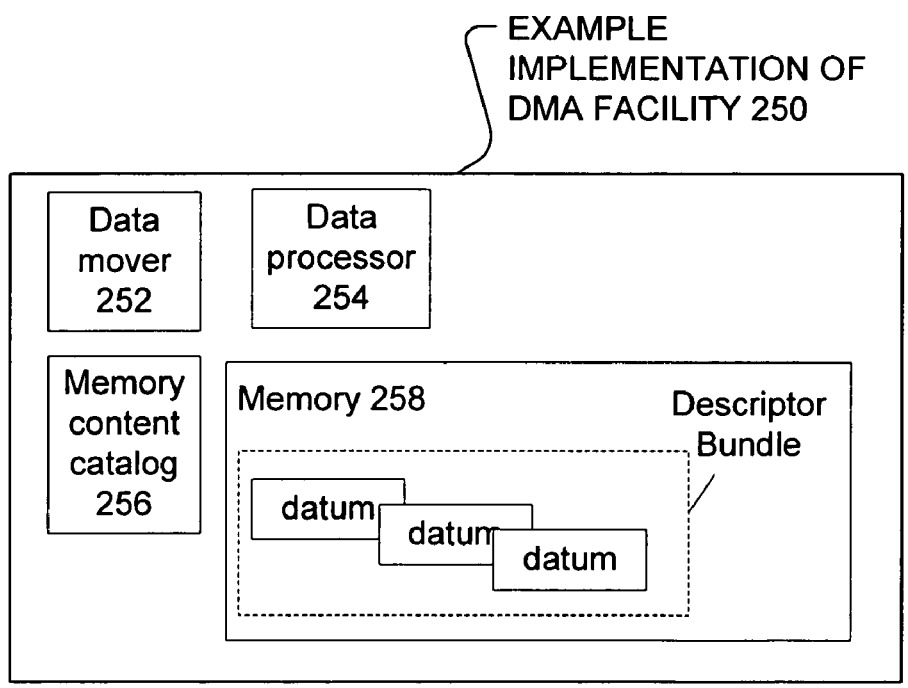
FIG. 2B depicts an example implementation of a DMA facility that may be used in an embodiment of the present invention.

FIG. 2B depicts an example implementation of a DMA facility that may be used in an embodiment of the present invention. In one embodiment, from a single retrieval of a datum from a memory source external to the DMA facility (such as, but not limited to, host memory), DMA facility may access the same datum multiple times. DMA facility 250 may include data mover 252, data processor 254, memory content catalog 256, and memory 258. Data mover 252 may be capable of transferring data between any source and destination. For example, data mover 252 may transfer data from source buffer 204 to memory 258 or from memory 258 to destination buffer 206, although other sources and destinations are possible. Data mover 252 may read descriptors from host memory and carry out the datum transfer operations specified by the descriptors. Data processor 254 may be capable of any processing of data transferred or received by data mover 252 such as validation of cyclical redundancy checking (CRC) or parity bit checking (e.g., as used in Redundant Array of Independent Disks (RAID) parity checking, although other but parity checking schemes can be used). The CRC validation operation may be part of an RDMA or other data transfer scheme.

Memory content catalog 256 may catalog which datum stored in memory 258 is tagged as (1) part of the same descriptor bundle as indicated by a link_to_next code in related descriptors and (2) is likely to be accessed again by the DMA facility as indicated by a buffer_hint code in a descriptor. For example, memory content catalog 256 may identify datum stored in memory 258 by the memory address span (e.g., start to finish) of addresses in a source memory from which the datum was provided (e.g., a source buffer in host memory), although other schemes can be used to identify datum stored in memory 258. In one embodiment, the buffer_hint code allows host software to specify the likelihood of reaccessability of a datum without regard to the actual buffering capability of the DMA facility, if any. In one embodiment, the buffer_hint code permits use of a scalable sized memory 258.

In one embodiment, memory 258 may store datum having a buffer_hint code set to indicate likely reaccess. Memory 258 may be implemented as a volatile memory device such as but not limited to a Random Access Memory (RAM), Dynamic Random Access Memory (DRAM), Static RAM (SRAM), or Synchronous DRAM.

In one embodiment, after a descriptor bundle is processed, memory 258 may evict all data associated with the same descriptor bundle. For example, a descriptor bundle may end after a buffer_hint code for a descriptor indicates there is no connection to a next descriptor.

In one embodiment, memory 258 may include full or partial buffering capability. For example, full buffering may provide for storage by memory 258 of all data to be accessed again by DMA facility 250 without any transfer of data from another device into DMA facility 250. For example, partial buffering may occur when memory 258 stores only a portion of datum to be accessed by DMA facility 250 and accordingly, DMA facility 250 will retrieve another portion of the datum (or the entirety of the datum) that is not stored in memory 258. For example, partial buffering may occur when the memory 258 does not have enough storage capacity to store an entire datum indicated as likely to be reaccessed. For example, the datum can be stored from the beginning forward to as much as can be stored in memory 258 or from end backwards for as much as can be stored in memory 258. In one embodiment, contents of memory 258 may be refreshed so that for example, if a datum that is partially stored in memory 258 is accessed multiple times, the entirety of the datum is stored in memory 258 as soon as possible.

DMA facility 250 may be implemented as any or a combination of: hardwired logic, software stored by a memory device and executed by a microprocessor, firmware, an application specific integrated circuit (ASIC), and/or a field programmable gate array (FPGA).

Figure 3:
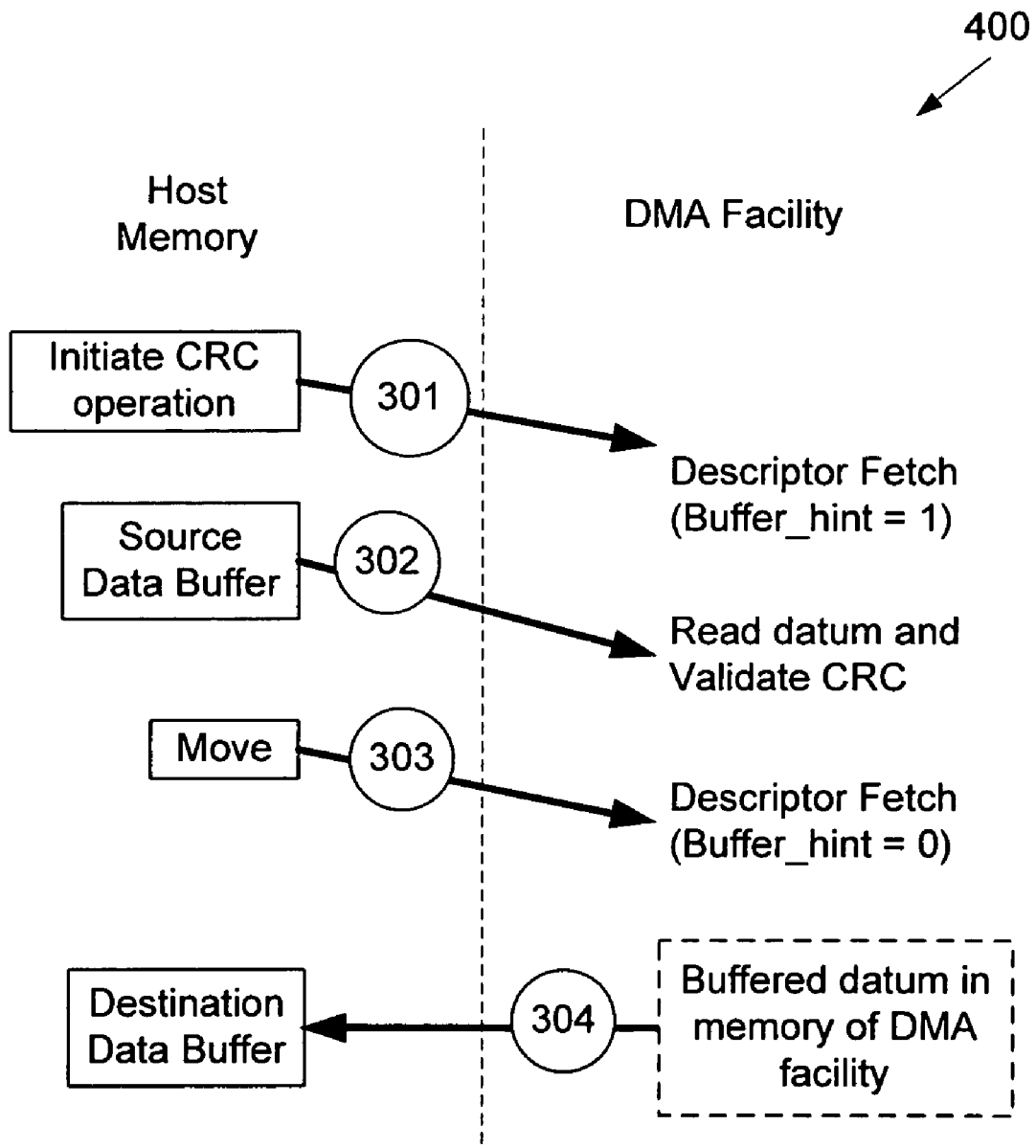
FIG. 3 depicts an example of a datum transfer process that can be used by a DMA facility to access the same datum multiple times using datum retrieved in a single datum transfer from host memory.

FIG. 3 depicts an example of a datum transfer process that can be used by a DMA facility to access the same datum multiple times using datum retrieved in a single datum transfer from host memory. In item 301, host software requests a descriptor fetch by a DMA facility. In response, the DMA facility retrieves the next descriptor. For example, the descriptor may describe an operation (e.g., bit processing or datum move), address of the target datum, length of the datum to move or process, buffer_hint code, and link_to_next code. The buffer_hint code specifies whether the datum to be retrieved will likely be requested to be accessed again by the DMA facility. The link_to_next code specifies whether the descriptor associated with the datum is associated with descriptors for other datum in a descriptor bundle. In this example, the descriptor describes a CRC validation operation for a target datum. In this example, buffer_hint code is "one" and accordingly specifies that another access of the datum by the DMA facility will likely occur. In response to processing the descriptor, the DMA facility requests transfer of the datum identified in the descriptor from a source buffer in host memory to the DMA facility.

In item 302, source data buffer in the host memory transfers the datum requested in item 301 to the DMA facility. After receiving the datum, the DMA facility reads the datum and validates a CRC of the datum. In response to the DMA facility reading a buffer_hint code as being "one", the DMA facility stores a portion of the datum associated with such buffer_hint code into a memory of the DMA facility. In one example, a memory content catalog of the DMA facility may identify each datum having an associated buffer_hint code of "one" and stored in the memory of the DMA facility.

In item 303, host software requests a second descriptor fetch by the DMA facility. In response to processing the second descriptor fetch, the DMA facility fetches a descriptor which describes a move operation for a target datum. In this example, the buffer_hint code of the retrieved descriptor is "zero" indicating the datum to be retrieved is not likely to be accessed again. In response to processing the descriptor, the DMA facility recognizes the requested datum is currently stored in memory of the DMA facility. For example, to determine whether the datum is currently stored in the memory of the DMA facility, the DMA facility may compare the span of addresses associated with the datum retrieval request in the current descriptor with the span of addresses of datum identified by a memory content catalog as stored in the DMA facility.

In item 304, the DMA facility performs another access on the internally buffered datum requested in item 303 because the descriptor refers to datum buffered in memory in the DMA facility. In item 304, the DMA facility transfers the target datum requested to be transferred in item 303 from the memory of the DMA facility to the destination memory address specified by the descriptor fetch instead of requesting datum from a source buffer. Accordingly, by use of the buffer_hint field, a memory content catalog in the DMA facility, and storing datum having a buffer_hint code of "one" into memory of the DMA facility, multiple accesses to a datum retrieved once from an external memory may occur. For example, by use of the buffer_hint code, a destination address involved in a datum move under RDMA may be validated and then used for a datum transfer by only accessing the destination address once from an external memory source.

Figure 4A:
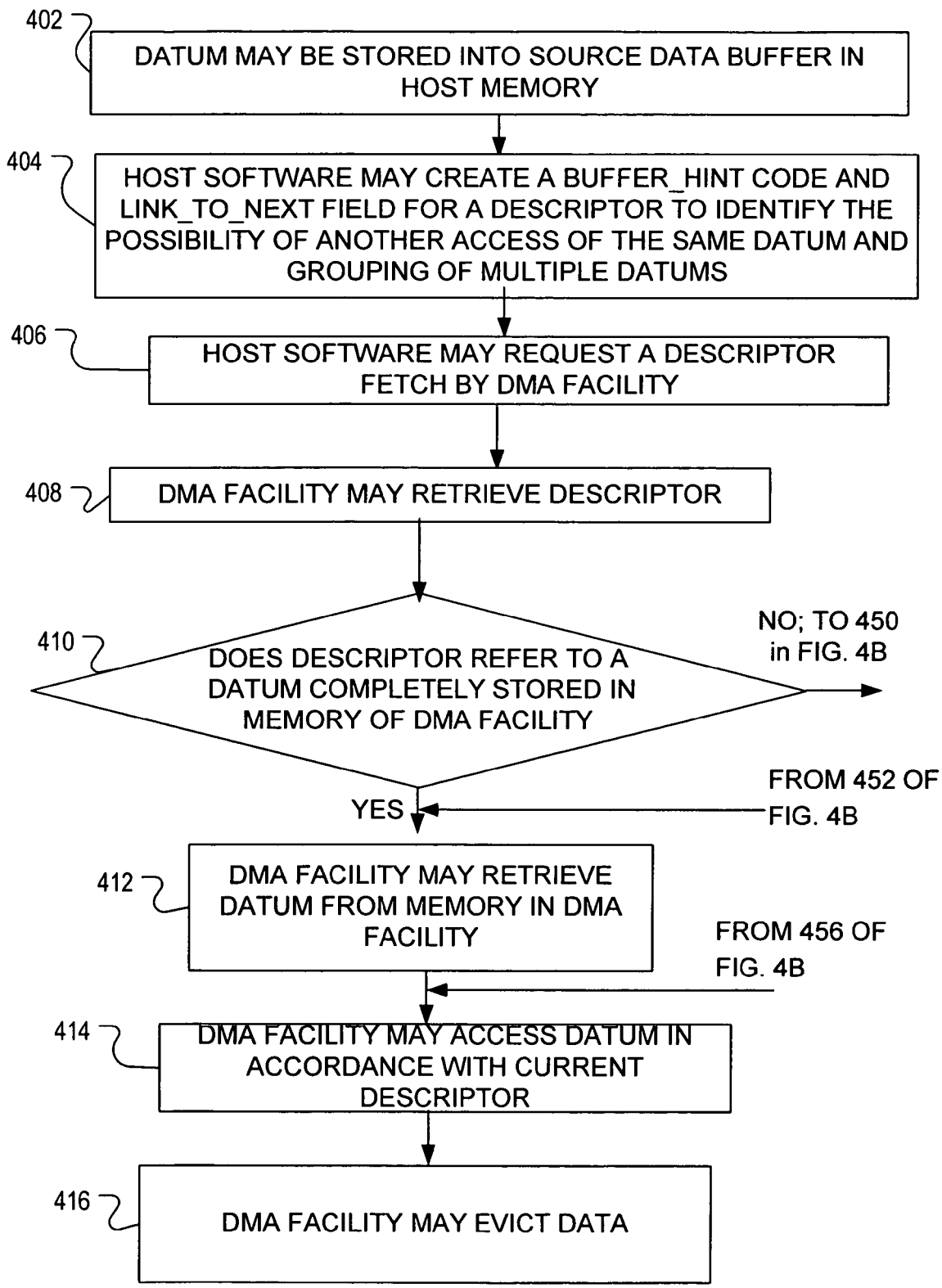
FIGS. 4A and 4B depict example flow diagrams that can be used in an embodiment of the present invention.
Figure 4B:
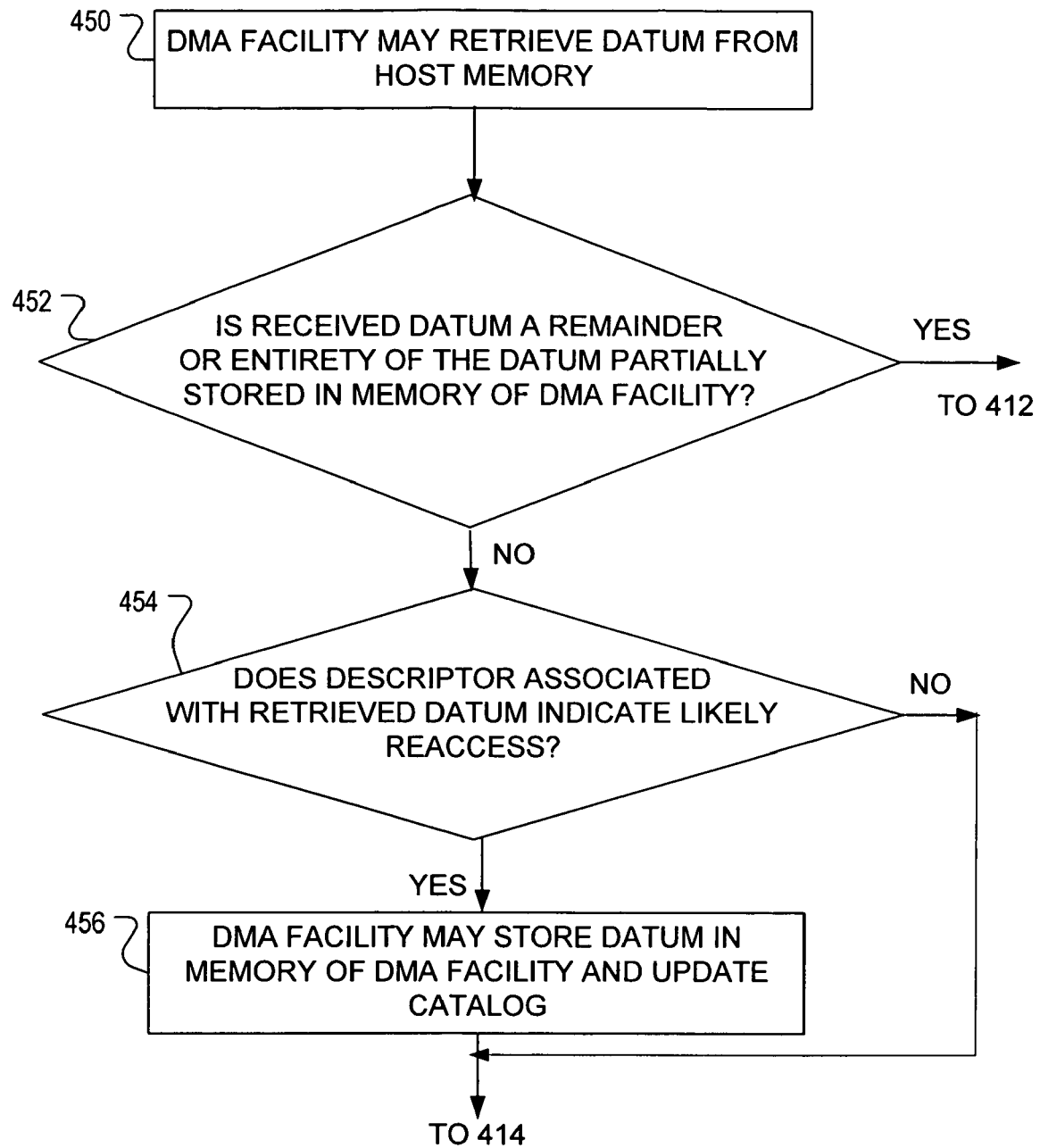

FIGS. 4A and 4B depict example flow diagrams that can be used by a DMA facility to access the same datum multiple times using datum retrieved in a single datum transfer from host memory in accordance with an embodiment of the present invention. In block 402, a datum may be stored into source data buffer in host memory. For example, the datum may be a packet received by a network interface from a network such as an Ethernet compatible packet.

In block 404, host software may create a buffer_hint code and link_to_next field for a descriptor to identify respective likelihood of another access of the same datum and grouping of multiple datums. For example, a buffer_hint code value of "1" may indicate likely reaccess whereas a buffer_hint code value of "0" may indicate likely no reaccess of the datum.

In block 406, host software may request a descriptor fetch by a DMA facility.

In block 408, the DMA facility may retrieve the descriptor associated with the descriptor fetch request.

In block 410, the DMA facility may determine whether the current descriptor refers to a datum completely stored in memory of the DMA facility. For example, to determine whether the datum is completely stored in the memory of the DMA facility, the DMA facility may determine whether the span of addresses referred to by the descriptor match those associated with any datum stored in memory of the DMA facility. If there is a complete overlap in span of addresses, then the descriptor refers to a datum stored in the memory of the DMA facility and block 412 may follow. If there no overlap or there is not complete overlap of span of addresses, then at least a portion of datum referred to by the current descriptor is not stored in the memory of the DMA facility and block 450 may follow.

In block 412, the DMA facility may retrieve the portion of datum associated with the current descriptor from memory in the DMA facility. The portion may be the entire datum or a subset of the datum.

In block 414, the DMA facility may access the datum in accordance with a current descriptor. For example, access may include a datum move or processing of contents of the datum such as, but not limited to, bit parity processing or validation of CRC. In block 414, the processed datum may be a combination of datum that was partially stored in the DMA facility as well as a retrieved unstored portion from block 450.

In block 416, DMA facility may evict data in a bundle. For example, the link_to_next field associated with each descriptor identifies whether a next accessed descriptor is part of the same grouping. For example, when the link_to_next field of the current descriptor indicates no next link, all data associated with a descriptor bundle and linked with the link_to_next field which indicates no next link may be evicted from memory of the DMA facility.

In block 450 (FIG. 4B), the DMA facility may retrieve from host memory the datum associated with the current descriptor or a portion of the datum not stored in the memory of the DMA facility and associated with the current descriptor. For example, the datum or portion of the datum may be located in a source buffer in host memory. In one embodiment, in the event a portion of the datum is not stored in the memory of the DMA facility, the entirety of the datum may be retrieved from the source buffer.

In block 452, the DMA facility may determine whether the received datum associated with the current descriptor is the remainder or entirety of the datum partially stored in memory of DMA facility. If the received datum associated with the current descriptor is the remainder or entirety of the datum partially stored in memory of DMA facility, block 412 may follow. If the received datum associated with the current descriptor is not the remainder and not the entirety of the datum partially stored in memory of the DMA facility, block 454 may follow.

In block 454, the DMA facility may determine whether the descriptor associated with the retrieved datum indicates likely reaccess. For example, the DMA facility may determine whether the descriptor associated with retrieved datum has a buffer_hint code that indicates likely reaccess of the retrieved datum. If the buffer_hint code indicates likely reaccess, then block 456 may follow 454. If the buffer_hint code does not indicate likely reaccess, then the DMA facility does not store the datum into memory of the DMA facility and block 414 may follow block 454.

In block 456, the DMA facility may store the datum retrieved in block 450 into the memory of the DMA facility and update a memory content catalog. In one example, a memory content catalog of the DMA facility may identify each datum having an associated buffer_hint code that indicates likely reaccess and stored in the memory of the DMA facility by its range of addresses in which the datum was stored in the source memory of the datum. Block 414 (FIG. 4A) may follow block 456.

The drawings and the forgoing description gave examples of the present invention. While a demarcation between operations of elements in examples herein is provided, operations of one element may be performed by one or more other elements. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
receiving a request to retrieve a first datum from a first memory device, wherein the request includes a first field that indicates whether a DMA facility is to access the first datum a second time after a first time;
receiving the first datum;
selectively storing a portion of the first datum into a memory in the DMA facility in response to an indication that the first field indicates the first datum is to be accessed the second time by the DMA facility, wherein the request further comprises a second field that indicates whether the first datum corresponds to a bundle and wherein the bundle corresponds to a logical group of descriptors; and
evicting datum corresponding to the bundle in response to an indication that the bundle is processed.

2. The method of claim 1, further comprising:
receiving a second request to access a second datum;
determining whether the second datum is stored in the memory in the DMA facility; and
selectively retrieving at least a portion of the second datum from the memory in the DMA facility in response to a determination that the second datum is stored in the memory in the DMA facility.

3. The method of claim 1, further comprising:
receiving a second request to access a second datum;
determining whether the second datum is stored in the memory in the DMA facility; and
selectively retrieving at least a portion of the second datum from a memory external to the DMA facility in response to a determination that the second datum is not stored in the memory in the DMA facility.

4. The method of claim 1, further comprising forming the first field in host software.

5. The method of claim 1,
wherein evicting the datum corresponding to the bundle is performed in response to an indication the bundle is ended.

6. The method of claim 1, further comprising:
performing datum processing on datum, wherein the datum processing comprises validation of cyclical redundancy checking.

7. The method of claim 1, further comprising:
performing datum processing on datum, wherein the datum processing comprises bit parity processing.

8. The method of claim 1, further comprising:
receiving a second request to access a second datum;
determining whether the second datum is completely stored in the memory in the DMA facility; and
selectively retrieving a first portion of the second datum from the memory in the DMA facility and retrieving a second portion of the second datum from a memory external to the DMA facility both in response to a determination that the second datum is not completely stored in the memory in the DMA facility.

9. An apparatus comprising:
a DMA facility capable of transmitting datum to a memory device external to the DMA facility and receiving datum from the external memory, the DMA facility comprising:
logic circuitry capable to store at least one datum, the logic circuitry to store datum is to store at least a portion of datum having a first field that indicates whether the DMA facility is to access the datum a second time after a first time; and
logic circuitry to access datum, the logic circuitry to access datum is capable to access a portion of the same datum multiple times using a single retrieval of the datum from the external memory and the logic circuitry to access datum is to determine when to retrieve a portion of datum from the logic circuitry to store datum or to request datum from the external memory device in response to a request received by the DMA facility to access datum, wherein the at least one datum is to comprise a second field that indicates whether a portion of the at least one datum corresponds to a bundle, the bundle to correspond to a logical group of descriptors, wherein datum corresponding to the bundle is to be evicted in response to an indication that the bundle is processed.

10. The apparatus of claim 9, wherein the external memory comprises a host memory.

11. The apparatus of claim 9, wherein logic circuitry to store datum is to evict datum corresponding to the bundle after an indication of end of the bundle.

12. The apparatus of claim 9, wherein the logic circuitry to access datum is to perform validation of cyclical redundancy checking on datum.

13. The apparatus of claim 9, wherein the logic circuitry to access datum is to perform bit parity processing on datum.

14. The apparatus of claim 9, wherein logic circuitry to determine when to retrieve a portion of datum from the logic circuitry to store datum or to request datum from the external memory device is to request at least a portion of datum from the external memory in response to datum marked as to be accessed the second time from memory not being completely stored in the logic circuitry to store datum.

15. The apparatus of claim 9, wherein the access comprises at least one of a datum transfer operation to the memory device or a datum processing operation.

16. The apparatus of claim 9, wherein the datum comprises a destination address of the external memory and wherein the logic circuitry to access datum is to validate a cyclical redundancy checking code of the destination address and perform a datum transfer to the destination address in the external memory.

17. A system comprising:
a host system comprising a processor and a memory device;
a bus;
a chipset to communicatively couple the host system to the bus; and
a DMA facility capable of transmitting datum to a memory device external to the DMA facility and receiving datum from the external memory, the DMA facility comprising:
logic circuitry capable to store at least one datum, wherein the logic circuitry to store datum is to store at least a portion of datum having a first field that indicates whether the DMA facility is to access the datum a second time after a first time, and
logic circuitry to access datum, the logic circuitry to access datum is capable to access a portion of the same datum multiple times using a single retrieval of the datum from the external memory and the logic circuitry to access datum is to determine when to retrieve a portion of datum from the logic circuitry to store datum or to request datum from the external memory device in response to a request received by the DMA facility to access datum, wherein the at least one datum is to comprise a second field that indicates whether a portion of the at least one datum corresponds to a bundle, the bundle to correspond to a logical group of descriptors, wherein datum corresponding to the bundle is to be evicted in response to an indication that the bundle is processed.

18. The system of claim 17, further comprising a network interface communicatively coupled to the bus.

19. The system of claim 17, wherein the bus is compatible with PCI.

20. The system of claim 17, wherein the bus is compatible with PCI express.

* * * * *